No. 883,270.

PATENTED MAR. 31, 1908.

D. K. WILSON.
MANURE SPREADER.
APPLICATION FILED JUNE 17, 1907.

WITNESSES:
O. D. Young.
H. M. Harper.

INVENTOR
Dalton K. Wilson,
BY
G. C. Kennedy.
ATTORNEY

UNITED STATES PATENT OFFICE.

DALTON K. WILSON, OF WATERLOO, IOWA, ASSIGNOR TO THE WILLIAM GALLOWAY COMPANY, OF WATERLOO, IOWA, A CORPORATION.

MANURE-SPREADER.

No. 883,270.

Specification of Letters Patent.   Patented March 31, 1908.

Application filed June 17, 1907.  Serial No. 379,355.

*To all whom it may concern:*

Be it known that I, DALTON K. WILSON, a citizen of the United States of America, and a resident of Waterloo, Blackhawk county, Iowa, have invented certain new and useful Improvements in Manure-Spreaders, of which the following is a specification.

My invention relates to improvements in manure spreaders, and the object of my improvement is to provide an improved ratchet device wherewith to drive the movable apron such device being furnished with means for varying the speed of the apron relative to the advance of the machine. This object I have attained by the mechanism which is hereinafter described and claimed, and which is illustrated in the accompanying drawings, in which:—

Figure 1:
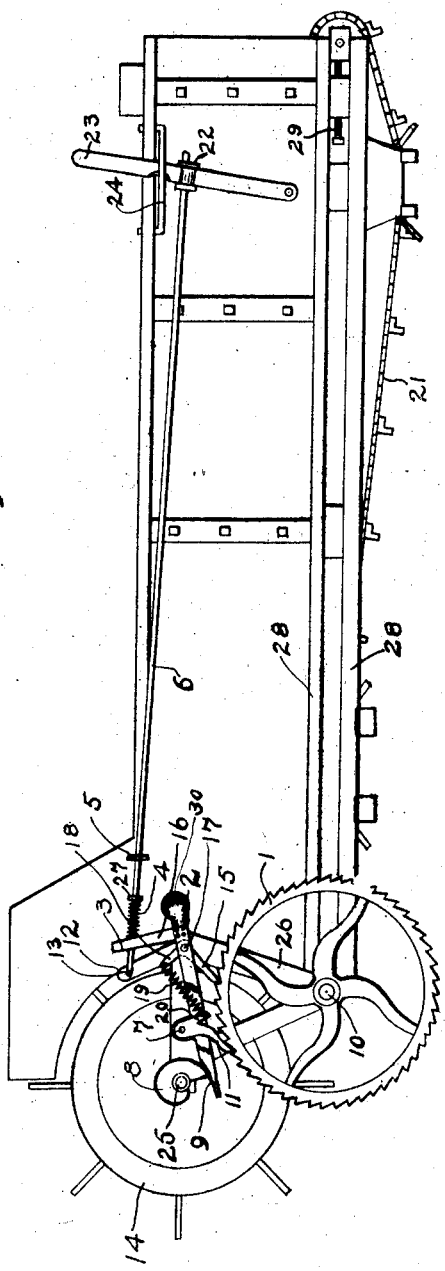
Figure 2:
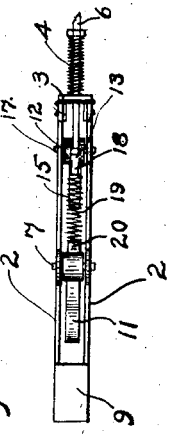

Figure 1 is a side elevation of the wagon-box of a manure spreader supplied with my improved ratchet-driving device. Fig. 2 is a detail plan view of a part of such device.

Similar reference numerals refer to similar parts throughout the several views.

The wagon-box 28 is supplied at its rear end with a bracket 26 on each side, which supports the rotatable shaft 25 on which is fixed the beater-drum 14. An endless apron 21 is mounted in said box 28 to move about front and rear sprocket-wheels, the rear sprockets (not shown) being secured to a transverse shaft 10, on one end of which is secured a large ratchet-wheel 1. A cam-wheel 8 is secured to the shaft 25 on the same side of the box as the ratchet-wheel 1, and is adapted to drive said ratchet-wheel by means of the following described connections and moving and contacting elements. A lever composed of two parallel side-bars 2—2 is pivoted near one end on a stud 17 projecting outwardly from the forward upper corner of the bracket 26. The upper portion of the rear end of said lever 2—2 is beveled and covered over by a contact-plate 9, and the plate 9 is contacted by the cam-wheel 8 to impart a swinging up and down movement to the said lever. The weight 30 secured to the forward end of the lever 2—2 keeps the rear end of the lever normally in operative contact with the edge of the cam-wheel 8. The space between the side-bars 2—2 is open forward of the plate 9, and in that space a pawl 11 is pivoted on a rod 7 extending from one bar 2 to the other. In the forward part of such space another pawl 15 is pivoted on the stud 17. The pawl 11 has a depending projection 20, and the pawl 15 has an upper arm 18, and between the projection 20 and the arm 18 a coiled tension spring 19 is connected. A lever 12 has its lower end pivoted on the stud 17, while to its upper end is pivoted the rear end of the connecting-rod 6 on a stud 13. The lever 12 and the pawl 15 are secured together and act together pivotally upon the stud 17. The pawls 11 and 15 are adapted to respectively engage the teeth of the ratchet-wheel 1.

The forward end of the lever 2—2 has an upward projection formed of two uprights connected by a face-plate 3 which has a bearing-orifice near its upper end. The connecting-rod 6 is slidable within the orifice in the plate 3. A short distance anterior to the plate 3 a ring or lug 27 is secured to the rod 6, and a coiled compression spring encircles said rod between said lug and plate. The rod 6 is slidable in an ear 5 extending from the outer side of the box 28, the forward end of said rod being mounted in a swivel-bearing 22 connected to the hand-lever 23 at a point intermediate between its ends. The lower end of the hand-lever 23 is pivoted to the forward part of the box 28, while its upper end engages a rack-bar 24, whereby it may be set or adjusted a desired distance forward or back.

When the beater-drum-shaft 25 is rotated, the cam-wheel 8 imparts a swinging movement to the lever 2—2, and the pawl 11 drives the ratchet-wheel 1 through the space of a certain number of teeth, such number being determined by the adjustment of the lever 23 in its rack-bar 24. When the lever 23 is moved back its action is to cause through spring 4 the lever 2—2 to lower with its pawls 11 and 15, which diminishes the amplitude of movement of said parts and permits the ratchet-wheel to be moved over a space of a lesser number of teeth. The throwing forward of the hand-lever allows the lever 2—2 and pawls to lift, and accelerate the movement of the apron by moving the pawls over a space of a greater number of teeth, and when the lever 23 is thrown backward to the extreme position said lever 22 is held down from the cam-wheel which stops the movement of the apron 21. When the lever 2—2 lowers, the pawl 15 clicks over the teeth of the ratchet-wheel as the pawl 11 drives the latter, the spring-connection 19 keeping both pawls always in contact with said ratchet-wheel. When the lever 2—2 rises the pawl 15 holds said wheel while the pawl 11 is clicking over it. The spring 4 forms a resilient connection between the rod 6 and the plate 3, and prevents breakage of the connecting parts, when the lever 23 is quickly shifted in position.

Having described my invention, what I claim as new, and desire to secure by Letters Patent, is:—

1. In a manure spreader, the combination of a wagon-box, a movable apron therein, a rotatable shaft adapted to drive said apron, a ratchet-wheel secured to said shaft, a rotatable driving-shaft supported near said ratchet-wheel, a cam-wheel secured to said driving-shaft, a lever pivotally connected to said wagon-box and adapted to be actuated by said cam-wheel, a pawl pivoted to said lever and adapted to drive said ratchet-wheel, a holding pawl pivoted to said box and adapted to engage the teeth of said ratchet-wheel, a resilient connection between said pawls adapted to keep them both in contact with the teeth of said ratchet-wheel, a projecting arm secured to the upper end of the holding pawl, a rack-bar on said wagon-box, a hand-lever pivoted to said wagon-box and adapted to engage said rack-bar, and a link between said hand-lever and said projecting arm.

2. In a manure-spreader, the combination of a wagon-box, a movable apron therein, a rotatable shaft adapted to drive said apron, a ratchet-wheel secured to said shaft, a rotatable driving-shaft supported near said ratchet-wheel, a cam-wheel secured to said driving-shaft, a lever pivotally connected to said wagon-box and adapted to be actuated by said cam-wheel, a weight on the forward end of said lever adapted to keep the rear end thereof in operative contact with said cam-wheel, a pawl pivotally suspended from said lever and adapted to drive said ratchet-wheel, a holding pawl pivoted to said box forward of the driving pawl and adapted to engage with the teeth of said ratchet-wheel, a projecting arm secured to the upper end of the holding pawl, a rack-bar on said wagon-box having grooves, a hand-lever pivoted to said wagon-box and adapted to engage the grooves of said rack-bar, and a link-connection between said hand-lever and said projecting arm.

3. In a manure-spreader, the combination of a wagon-box, a movable apron therein, a rotatable shaft adapted to drive said apron, a ratchet-wheel secured to said shaft, a rotatable driving-shaft supported near said ratchet-wheel, a cam-wheel secured to said driving-shaft, a lever pivotally connected to said wagon-box and adapted to be actuated by said cam-wheel, a weight on the forward end of said lever adapted to keep the rear end thereof in operative contact with said cam-wheel, a pawl pivotally connected to said lever and adapted to drive said ratchet-wheel, a holding pawl pivoted to said box and engaging the teeth of said ratchet-wheel, a projecting arm secured to the upper end of said holding pawl, a rack-bar on said wagon-box, a hand-lever pivoted to said wagon-box and adapted to engage said rack-bar, a link between said hand-lever and said projecting arm, and a resilient connection between said link and the forward member of the cam-actuated lever.

4. In a manure spreader, the combination of a wagon-box, a movable apron therein, a rotatable shaft adapted to drive said apron, a ratchet-wheel secured to said shaft, a rotatable driving-shaft supported near said ratchet-wheel, a cam-wheel secured to said driving-shaft, a lever pivotally connected to said wagon-box and adapted to be actuated by said cam-wheel, a weight on the forward end of said lever adapted to keep the rear end thereof in operative contact with said cam-wheel, a pawl pivoted to said lever and adapted to drive said ratchet-wheel, a holding pawl for said ratchet-wheel, a resilient connection between said pawls adapted to keep them both in contact with the teeth of said ratchet-wheel, a projecting arm secured to the upper end of the holding pawl, an upwardly extending arm on the forward end of the pawl-carrying lever, a rack-bar on said wagon-box, a hand-lever pivoted to said wagon-box and adapted to engage said rack-bar, a link between said hand-lever and the projecting arm on the forward pawl, and a resilient connection between said link and the upwardly extending arm on the forward end of the pawl-carrying lever.

Signed at Waterloo, Iowa, this 15th day of June 1907.

DALTON K. WILSON.

Witnesses:
G. C. KENNEDY,
O. D. YOUNG.